(No Model.)

A. ALTMAYER.
Manufacture of Boots and Shoes.

No. 239,915.           Patented April 12, 1881.

Witnesses:

Inventor:

UNITED STATES PATENT OFFICE.

ABRAM ALTMAYER, OF SAN FRANCISCO, CALIFORNIA.

MANUFACTURE OF BOOTS AND SHOES.

SPECIFICATION forming part of Letters Patent No. 239,915, dated April 12, 1881.

Application filed August 28, 1880. (No model.)

*To all whom it may concern:*

Be it known that I, ABRAM ALTMAYER, of the city and county of San Francisco, in the State of California, have made and invented a new and useful Improvement in the Manufacture of Boots and Shoes, which invention is fully set forth and described in the following specification and the accompanying drawings therein referred to.

My invention relates to an improvement in riveted seams for the manufacture of water-tight articles. It is specially intended for the production and manufacture of water-tight boots and shoes of leather of the heavier kinds, designed for laborers' and workingmen's wear.

The object of the improvement is to produce a water-tight indestructible seam having no projecting parts or edges to be exposed for receiving rubbing and abrading action, and presenting a flat and substantially smooth surface on both sides of the article.

To such end it consists in beveling and lapping upon and over each other the adjacent edges of the parts or pieces of material to be united; then placing in between these overlapped portions and along the length of the seam to be formed a filling-strip of flexible material, and then binding and uniting these parts and layers of material firmly and closely together, so as to produce a tight and impervious seam by means of metallic rivets or fastenings laid in a row along the lap and through the several thicknesses thereof, and secured by being upset or headed on the opposite side of the seam.

Figure 1:
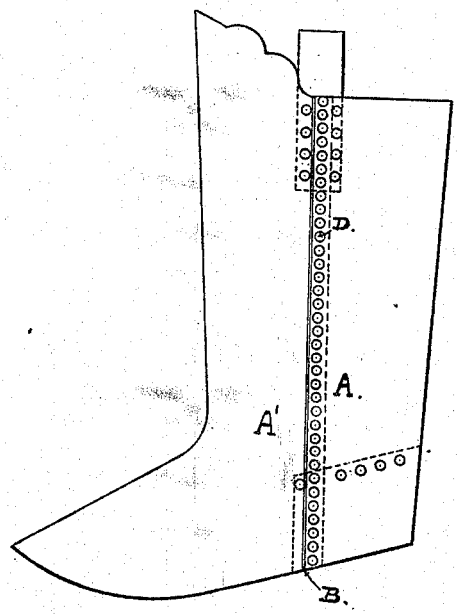
Figure 2:
Figure 3:
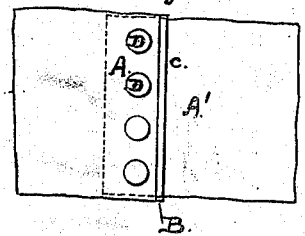

In the accompanying drawings I show in Figure 1 the application of my improved seam to the manufacture of boots; in Fig. 2, a sectional view, and in Fig. 3 a detail view, of the manner of joining two pieces of material together by my improved seam.

Let A A' represent two pieces of material, to be permanently united together in the manufacture of an article required to be water-tight. The adjacent edges of each piece A A' are beveled, and along the edge of one part, A', I place a strip of flexible material, such as leather or cloth, for the length of the seam to be made, and upon this narrow strip B, I place the edge of the second piece of material, A, in such manner that it covers and overlaps this strip B, and the distance from the edge of the under part, A', to the edge of the upper overlapped part, A, is of the width required for the rivets or metallic fastenings employed for the seam. Through these three thicknesses of material I insert, in a line about midway between the edges of the parts A A', a number of rivets, D D, laid closely together and upset or headed on the under side by mechanical means, and so as to bind and hold the parts A A' firmly and tightly together, with the interposed strip B compressed between them. The middle strip, B, clamped between the two overlapped surfaces, serves to fill up and close the seam without the necessity of using cement or lines of stitching to close the edges outside of or beyond the line of the rivets.

To produce a finished and attractive appearance upon the upper or front part of the seam I make a bead or rounded edge, c, upon the outside edge of the strip B, of about the same thickness as the thickness of the upper portion, A, and this rounded edge will be laid closely against the edge of the upper portion, A, so as to cover or conceal it. The form and application of the rounded edge of the strip B will be readily understood from Fig. 2 of the drawings. The seam thus produced presents a flat and practically smooth surface upon both the inner and outer sides. It is flexible and pliable. It is permanently water-tight, and is unaffected by exposure to dampness, heat, and wet, all of which are essential qualities of a seam for water-tight articles, and especially for boots and shoes for workmen, artisans, and laborers who are exposed to heat and wet, to which class of articles my improvement is more particularly applicable.

Boots and shoes of this class or description have been made with overlapped seams and metallic fastenings; but in all such cases it has been found necessary to employ cement or a line of stitching, or both together, along the edges of the lap, in order to obtain the required water-tight condition or quality; but such construction is defective and of no practical value in the production of a water-tight article, as its exposure to heat and wet soon affects the cement and rots or weakens the line of stitching, and the result is, that the seam either gaps or opens with wear and continued exposure.

These means for rendering the seam tight and close have also the objection of making the seam stiff and unyielding, and therefore of but little service in the manufacture of boots and shoes, wherein strength, durability, and comfort to the wearer are points and qualities to be obtained in order to produce a merchantable article.

Having thus fully described my improvement, what I claim, and desire to secure by Letters Patent, is—

1. The improvement in flat riveted seams for water-tight articles, as herein described, the same consisting in laying and lapping the beveled edges of the parts or pieces of material to be united upon and over each other, then inserting between the overlapped surfaces a filling-strip of flexible material, and finally uniting these parts and layers together by means of a line of rivets or metallic fastenings which are passed entirely through the said layers and intermediate filling and upset or headed upon both sides, whereby a flat surface is produced upon both sides of the article and the line of seam is rendered water-tight, as herein set forth.

2. A boot or shoe having the several pieces forming its upper joined together by beveling, overlapping the adjacent edges to be united, and having a strip of suitable flexible material, B, interposed between the overlapping surfaces, and the whole joined and closely united together by means of a continuous line of rivets or metallic fastenings which are passed through the several thicknesses of the overlapped parts, whereby a water-tight seam presenting flat surfaces upon both sides of the material is produced without the use of cement or sewing, as and for the purpose set forth.

In witness whereof I have hereunto set my hand and seal.

ABRAM ALTMAYER. [L. S.]

Witnesses:
WM. F. CLARK,
EDWARD E. OSBORN.